(12) United States Patent
Johnson et al.

(10) Patent No.: US 8,482,729 B2
(45) Date of Patent: Jul. 9, 2013

(54) RADIATION RESISTANT SPECTROMETER INTERFACE

(75) Inventors: Robert A. Johnson, Litchfield, MN (US); Michael D. Maher, Hutchinson, MN (US); Bryan J. Scheele, Hutchinson, MN (US); Roger W. Schmitz, Hutchinson, MN (US); Dustin L. Kasel, Minnetonka, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 7 days.

(21) Appl. No.: 12/885,211

(22) Filed: Sep. 17, 2010

(65) Prior Publication Data

US 2011/0102791 A1    May 5, 2011

Related U.S. Application Data

(60) Provisional application No. 61/256,356, filed on Oct. 30, 2009.

(51) Int. Cl.
*G01J 3/02* (2006.01)

(52) U.S. Cl.
USPC .......................................... 356/300; 385/115

(58) Field of Classification Search
USPC .... 356/326, 317, 318, 417; 250/458.1–461.2; 422/82.07–82.08; 436/172; 600/317
See application file for complete search history.

(56) References Cited

U.S. PATENT DOCUMENTS

| | | | | |
|---|---|---|---|---|
| 2,442,462 A | * | 6/1948 | Kirschbaum | 600/323 |
| 2,897,473 A | * | 7/1959 | Heller | 439/447 |
| 3,461,856 A | * | 8/1969 | Polanyi | 600/323 |
| 5,052,105 A | | 10/1991 | Mische et al. | |
| 5,391,842 A | | 2/1995 | Bennin et al. | |
| 5,396,571 A | | 3/1995 | Saadatmanesh et al. | |
| 5,411,023 A | | 5/1995 | Morris, Sr. et al. | |
| 5,879,294 A | | 3/1999 | Anderson et al. | |
| 6,377,840 B1 | | 4/2002 | Gritsenko et al. | |
| 6,473,632 B1 | | 10/2002 | Myers | |
| 6,481,899 B1 | | 11/2002 | Quast et al. | |
| 6,667,803 B1 | | 12/2003 | Flessland et al. | |
| 6,839,583 B1 | | 1/2005 | Lewandowski et al. | |
| 7,165,893 B2 | | 1/2007 | Schmitz | |
| 7,239,901 B2 | * | 7/2007 | Gritsenko | 600/310 |
| 7,460,897 B1 | | 12/2008 | Flessland et al. | |
| 7,565,084 B1 | | 7/2009 | Wach | |
| 2003/0088163 A1 | | 5/2003 | Soller | |
| 2004/0022358 A1 | * | 2/2004 | Tomita | 378/70 |
| 2004/0086230 A1 | | 5/2004 | Lewandowski et al. | |

(Continued)

OTHER PUBLICATIONS

Hunsperger, Integrated Optics: Theory and Technology, p. 103-105, Springer-Verlag, 1984.*
International Search Report and Written Opinion issued in PCT/US2010/049359, mailed Nov. 16, 2010, 16 pages.

*Primary Examiner* — Gregory J Toatley
*Assistant Examiner* — Rufus Phillips
(74) *Attorney, Agent, or Firm* — Faegre Baker Daniels LLP (57) ABSTRACT

Devices, systems, and methods for measuring tissue oxygen saturation are disclosed. An illustrative spectrometer for interfacing an optical sensor with a display unit includes a number of measurement radiation sources, a number of radiation source fibers each optically coupled to one of the measurement radiation sources, a reflected radiation fiber optically coupled to the optical sensor, a measurement radiation output fiber including an image fiber, and a radiation mixing bar intermediate the radiation source fibers and the measurement radiation output fiber.

20 Claims, 8 Drawing Sheets

U.S. PATENT DOCUMENTS

2005/0277818 A1 12/2005 Myers
2006/0114457 A1 6/2006 Schmitz et al.
2007/0203406 A1 8/2007 Anderson et al.

* cited by examiner

FIG. 10

RADIATION RESISTANT SPECTROMETER INTERFACE

CROSS-REFERENCE TO RELATED APPLICATION

This application claims priority under 35 U.S.C. §119 to U.S. Provisional Application No. 61/256,356, filed on Oct. 30, 2009, entitled "Radiation Resistant Spectrometer Interface," which is incorporated herein by reference in its entirety for all purposes.

TECHNICAL FIELD

The present invention relates generally to a near infrared spectrometer for measuring tissue oxygen saturation.

BACKGROUND

Tissue oxygenation (StO2) is a proven indicator of perfusion status in patients experiencing undifferentiated shock. High-risk patients who receive continuous monitoring of StO2 from the trauma bay through ionizing radiation, such as X-ray and CT imaging, and other procedures to the operating room have been shown to receive effective interventions sooner, resulting in significant reductions in ICU admission, length of stay, morbidity and mortality.

Near infrared spectrometer systems are known and reported in, for example, U.S. Pat. No. 5,411,023 to Morris, Sr. et al. and U.S. Pat. No. 6,377,840 to Gritsenko et al. U.S. Pat. No. 5,411,023 discloses an optical sensor system for use on a patient in an MRI or other electrically isolated environment. Control and display modules transmit and receive electrical signals to a remotely located light source and light detector, respectively. Fiber optic cables transmit and receive analog optical signals between the light source/detector and the patient within the electrically isolated environment. Electrical signals from the light detector are transmitted over an electrical cable for analysis by the control unit to determine the patient's heart rate and oxygen saturation. To insure accurate analysis, the control unit is typically customized to work specifically with the remotely located light source and light detector. The fiber optic cables extend from the patient to outside the electrical field. In this way, attenuation of the analog optical and electrical signals is minimized. The fiber optic cables are susceptible to damage from exposure to radiation procedures such as X-ray and CT imaging. To prevent damage to the fiber optic cables, the patient interface is typically removed from the patient during radiation procedures.

U.S. Pat. No. 6,377,840 discloses a spectrophotometric instrument utilizing multiple LED's to provide measurement radiation at discreet wavelengths. The spectrometer includes an electronics package, a remotely located optical probe for interfacing with the patient measurement site and a probe connector for coupling the optical probe to the electronics package. The electronics package includes a processor/controller and an optical bench for detecting and processing radiation that has been reflected from the measurement site. The probe connector includes the measurement source and reference LED's; an electrical connector for connecting the LED's to the electronics package; optical fibers for transmitting measurement and reflected radiation to and from the optical probe; and optical connector ferrules for connecting reference and reflected radiation to the optical bench. The optical bench comprises a series of mirrors, band pass filters and photomultiplier tube sensors. The optical probe which interfaces with the patient measurement site is connected to the probe connector by an optical fiber bundle comprising a single fiber for each of the measurement radiation LED's and a single fiber for transmitting reflected radiation. To insure accurate control of the measurement radiation LED's and accurate analysis of the transmitted reflected radiation, the electronics package can be customized to work specifically with the probe connector and optical probe. The optical fiber bundle is susceptible to damage from exposure to radiation procedures such as X-ray and CT imaging. To prevent damage to the fiber bundle, the patient interface is typically removed from the patient during radiation procedures.

There remains a need for a spectrometer that is robust to ionizing radiation and provides continuous StO2 monitoring during radiation procedures. To further enhance the usefulness of the spectrometer, any such spectrometer could be compatible with various, generic display units, easy to use, compact, light weight and cost effective to manufacture.

SUMMARY

The present invention is a compact, StO2 spectrometer for interfacing an optical sensor with a display unit. The spectrometer may be remote from and intermediate the display unit and patient interface. The spectrometer interface may be releasably, electrically connected to the display unit and may be releasably, optically connected to the patient interface. In some embodiments, the spectrometer interface includes a plurality of measurement radiation sources; optics and light guides for conditioning and directing measurement, reference and reflected radiation; photodiodes for receiving reference and reflected radiation; and a processor for controlling the measurement radiation sources and converting reflected radiation signals into StO2 data.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figures 1, 2:
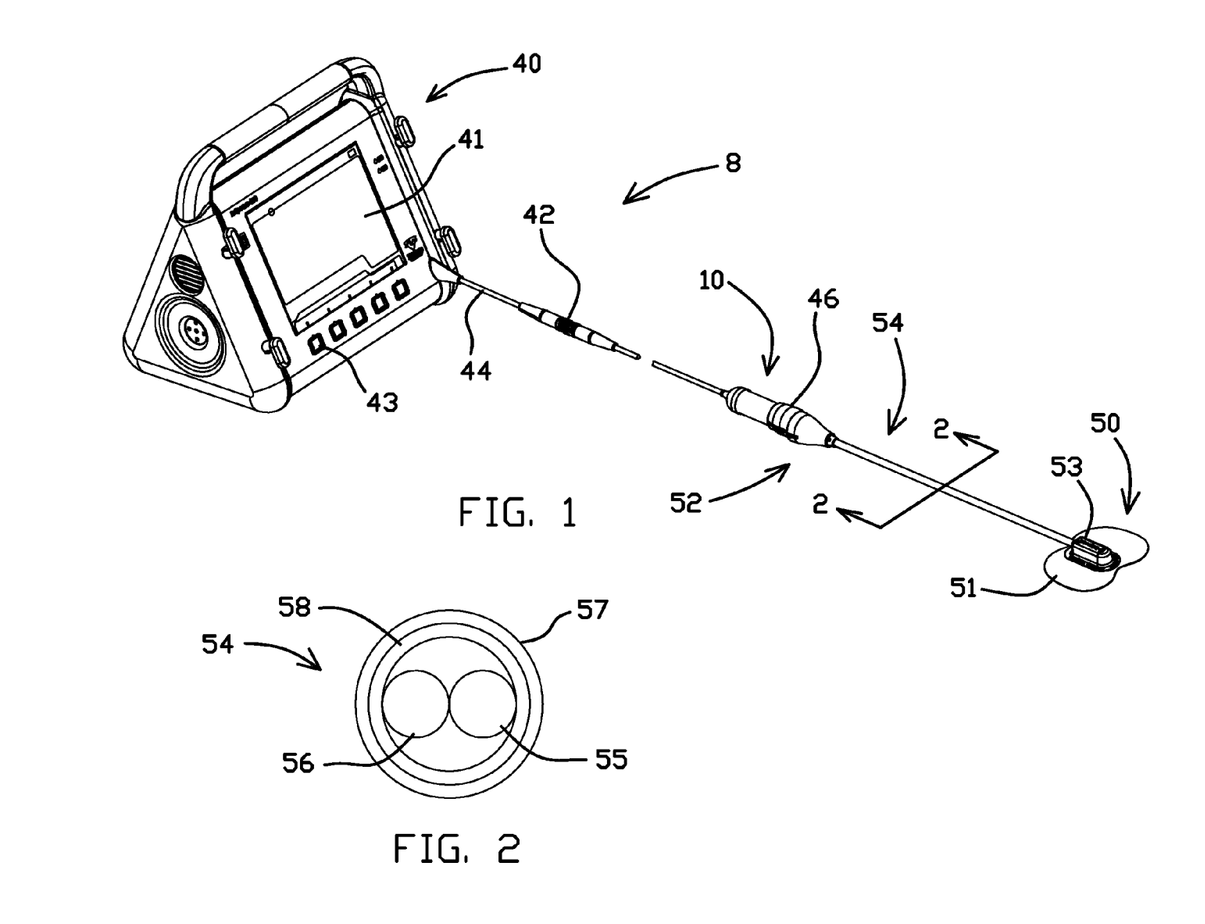
FIG. 1 is a perspective view of an StO2 monitoring system incorporating a spectrometer in accordance with an embodiment the present invention.
FIG. 2 is cross-sectional view, taken along line 2-2 in FIG. 1, of an optical cable according to the present invention.

FIG. 1 shows a tissue oxygenation or StO2 monitoring system 8 according to one embodiment of the present invention. The StO2 monitoring system 8 includes display unit 40, optical sensor 50 and spectrometer interface 10. Electrical connector 42 releasably connects spectrometer interface 10 to display unit 40 via electrical cable 44. Optical connector 52 releasably connects spectrometer interface 10 with optical sensor 50 via optical cable 54. In operation, StO2 monitoring system 8 directs measurement radiation from spectrometer 10 to a patient measurement site via optical cable 54 and optical sensor 50. Radiation reflected from the patient measurement site is then directed, via optical sensor 50 and optical cable 54, to spectrometer 10 where it is converted to StO2 data. The StO2 data is then sent, via electrical cable 44, to display unit 40.

Display unit 40 provides a power source for spectrometer interface 10 and displays StO2 measurement data in various user-defined formats. As shown, display unit 40 includes an LCD screen 41 and user interface touch pads 43. Display unit 40 may further include an AC power cord, backup battery power source and computer interface ports. An exemplary display unit is the Model 650 Monitor available from Hutchinson Technology of Hutchinson, Minn.

In the embodiment shown, optical sensor 50 includes an adhesive coated, fabric skirt or light shield 51 for attaching the sensor to a measurement site of a patient. A cap 53 attaches the sensor head to the skirt 51. Exemplary optical sensors are disclosed in, for example, U.S. Pat. No. 7,460,897 and U.S. Pat. No. 6,839,583, both of which are herein incorporated by reference in their entirety for all purposes.

FIG. 2, which is a cross section taken along line 2-2 in FIG. 1, shows an exemplary optical cable 54 comprising at least one send fiber 55 and at least one receive fiber 56. Send and receive fibers 55,56 transmit measurement and reflected radiation, respectively and are optically coupled, via connector 52, to spectrometer interface 10 at one end and optically coupled to the patient measurement site via sensor 50 at another end. Optical connector 52 includes alignment disk 45 (FIG. 3) and overmold nut assembly 46 which remain with spectrometer 10 upon detachment of sensor 50. One example of optical connector 52 is disclosed in, for example, U.S. Pat. No. 7,165,893, which is incorporated herein by reference in its entirety for all purposes. An aesthetic flexible covering 57 such as, for example, a thermoplastic polyurethane elastomer surrounds a radiation blocking or radiation shielding covering 58. Radiation shielding covering 58 surrounds and protects the send and receive fibers 55,56 from the damaging effects of external radiation, such as from x-ray and CT imaging procedures. In one embodiment, radiation shielding covering 58 is comprised of a tungsten-filled thermoplastic urethane. Other radiation shielding coverings may comprise, for example, lead, gold, platinum or bismuth. Radiation shielding covering 58 enables optical sensor 50 to be continuously attached to the patient during radiation procedures without compromising the optical properties of the send and receive fibers over the useful life of the sensor.

Figure 3:
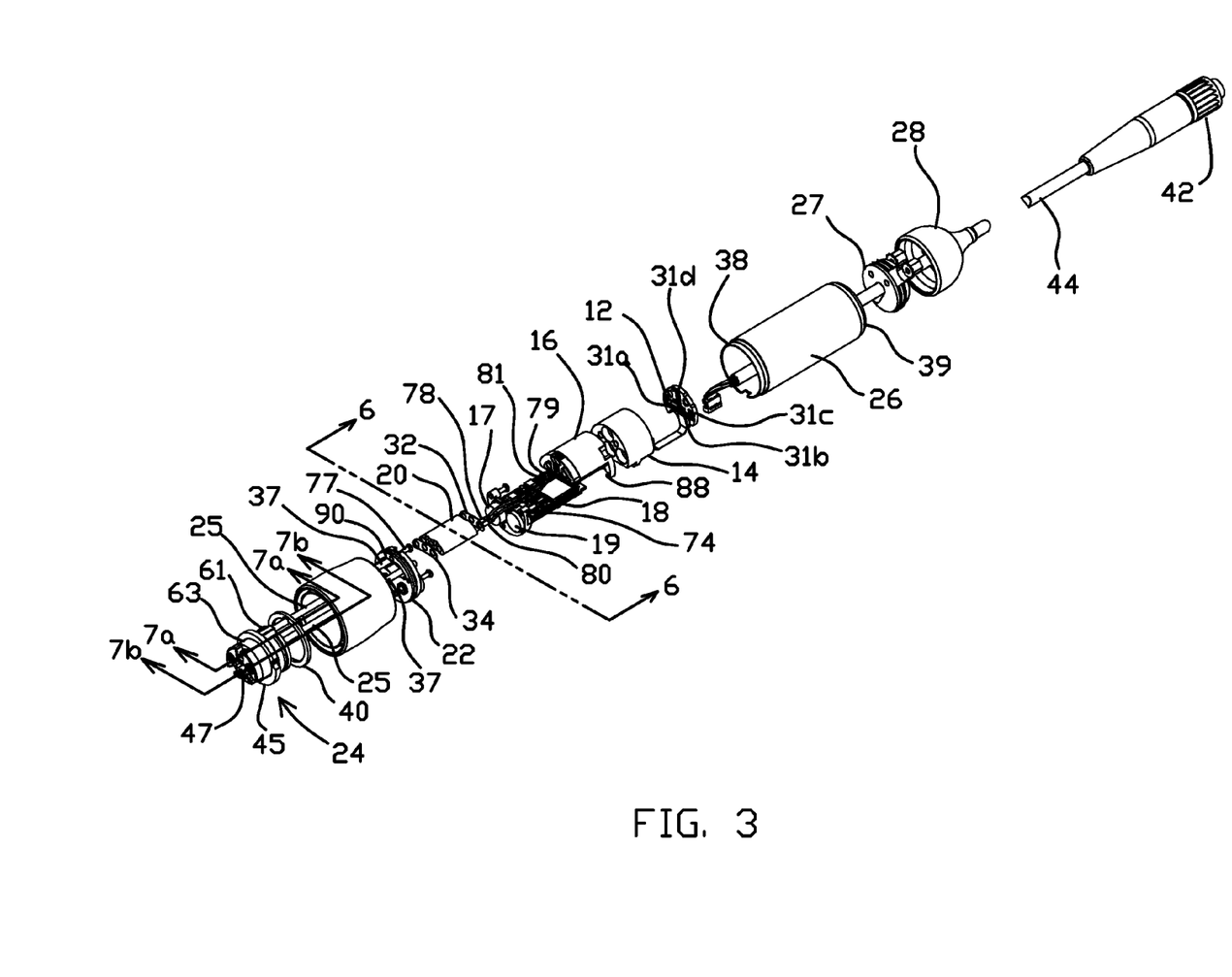
FIG. 3 is an exploded perspective view of a spectrometer interface according to an embodiment of the present invention.

An exploded perspective view of spectrometer interface 10 is shown in FIG. 3. In the illustrated embodiment, spectrometer interface 10 includes measurement radiation source board 12, source optics housing 14, radiation source fiber housing 16, processor board 18, reflected radiation photo diode 17, reference radiation photo diode 19, radiation mixing housing 20, photo diode housing 22 and fiber holder or housing 24. In one embodiment, radiation source board 12, housing 14, 16, 20, 22 and fiber holder 24 are essentially serially arranged or located. Alignment pins 25 extend the length of spectrometer 10 and provide for precise alignment of source board 12, optics, fiber and mixing housings 14, 16, 20 and fiber holder 24. In this way, precise alignment and coupling of the measurement radiation optics, reference radiation optics and reflected radiation optics is achieved.

Figure 7A:
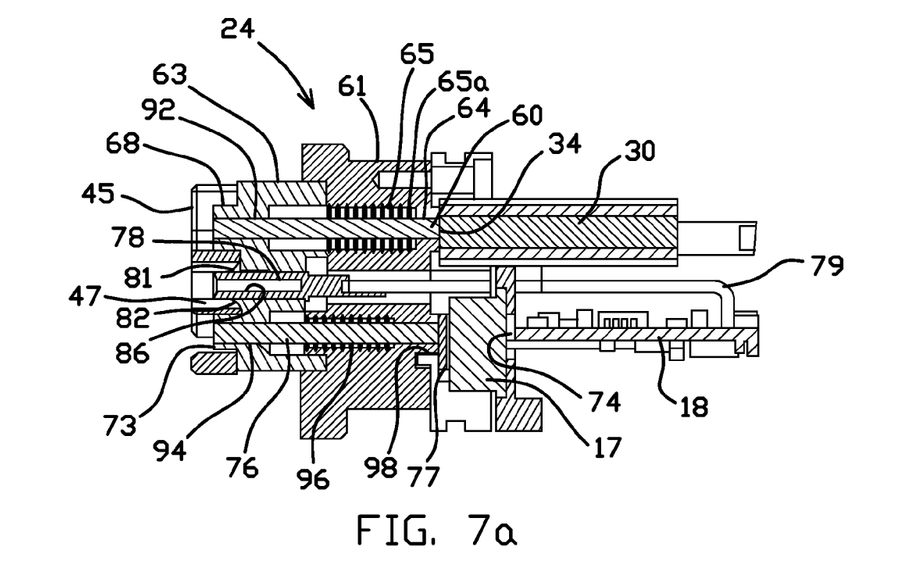
FIGS. 7a and 7b are cross-sectional views, taken along line 7a-7a, 7b-7b, respectively, in FIG. 3, of the fiber holder, photo diode housing, radiation mixing housing and processor board according to an embodiment of the present invention.
Figure 7B:
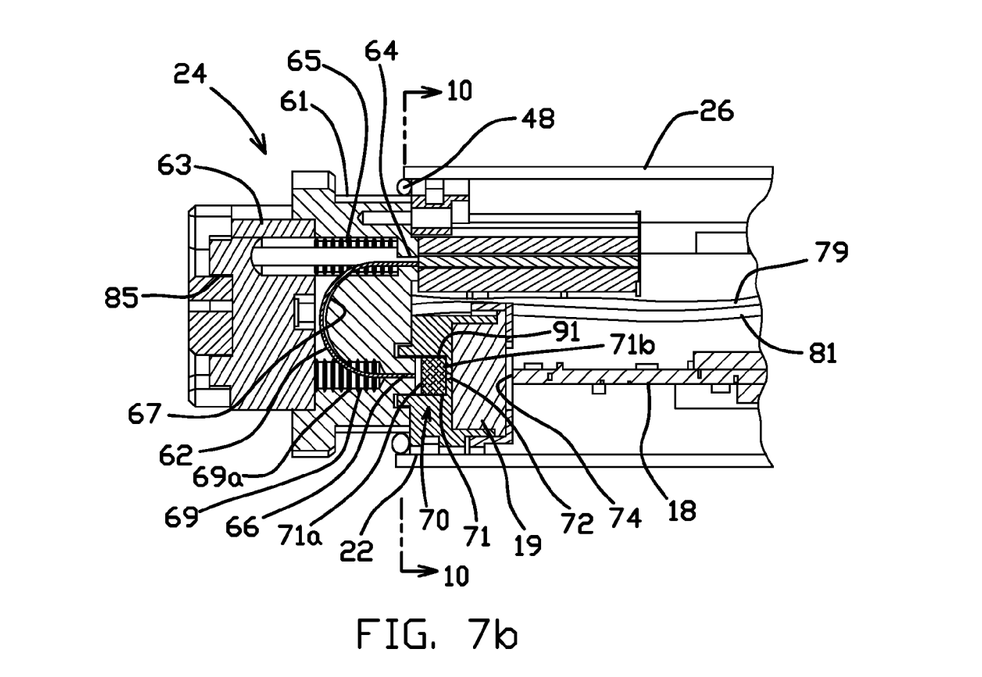

Measurement radiation optics (FIG. 4) includes lenses 11a, 11b, 11c, 11d; 15a, 15b, 15c, 15d; filters 13a, 13b, 13c, 13d; fibers 21a, 21b, 21c, 21d; mixing bar 30 and output fiber 60. Reference radiation optics (FIG. 7) includes reference radiation fiber 62 and attenuator 70. Reflected radiation optics (FIG. 4) includes reflected radiation fiber 76 and ambient light filter 77. An electrically conductive shield housing 26, comprised of material providing electromagnetic interference shielding and high yield strength, for example, C1008 ASTM steel, contains and protects the internal components of spectrometer interface 10. Retainer 27 guides and supports electrical cable 44 and encloses the proximal end of spectrometer 10. Alignment pins 25 include threaded ends 37 that protrude from the proximal end of retainer 27. Upon assembly, nuts (not shown) are fastened on to threaded ends 37 of alignment pins 25 compressing the spectrometer components together to insure optical coupling between measurement radiation, reference radiation and reflected radiation optics. A strain relief boot 28 provides additional support for electrical cable 44 and seals proximal end of spectrometer 10.

While the illustrated embodiment shows two pins aligning source board 12, housings 14, 16, 20 and fiber holder 24, other embodiments with a different number and/or pin configuration are also contemplated. For example, 3 or more alignment pins may be used. In still other embodiments, not shown, 2 or more alignment pins may be used to align fewer components. For example, pins 25 may align only the optics housing 14, fiber housing 16, mixing housings 20 and fiber holder 24. In the illustrated embodiment, alignment pins 25 have a circular cross-section though other cross-sectional shapes such as, for example, square, hexagonal, triangular or octagonal are contemplated as well.

As shown, shield housing 26 is open at its distal end 38 and substantially closed at its proximal end 39. In the embodiment shown, proximal end 39 includes openings for electrical cable 44 and alignment pins 25. Shield housing may have a circular cross section and, in one embodiment, is approximately 20-25 mm in diameter and approximately 50-60 mm long. Shield housing 26 may also have a generally square, rectangular, triangular or other cross-sectional geometry. Though shield housing 26 is shown to have an essentially constant cross sectional shape and size along its length, the cross sectional shape and size may vary between the housing's proximal end 39 and distal end 38. For example, housing 26 may have a smaller diameter at its distal end 38 and a larger diameter at its proximal end 39, or housing 26 may have a cross sectional shape that transitions from rectangular at its proximal end to circular at its distal end. In the embodiment shown, source board 12, source optics housing 14, radiation source fiber housing 16, processor board 18, radiation mixing housing 20 and photo diode housing 22 are sized and shaped to fit within shield housing 26.

Figure 10:
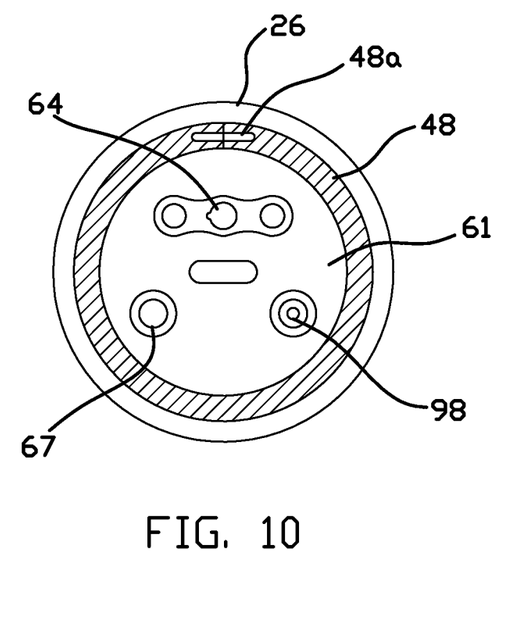
FIG. 10 is a cross-sectional view, taken along line 10-10 in FIG. 7b, of the conductive gasket according to an embodiment of the present invention.

By grounding distal end 38 of shield housing 26, a Faraday cage or Faraday shield is created which protects the internal components of spectrometer 10 from electromagnetic interference. In the embodiment shown, distal end 38 of shield housing 26 is grounded via conductive gasket 48 electrically coupling fiber holder 24 and shield housing 26. In one embodiment, shown in FIG. 10, conductive gasket 48 is a length of conductor-filled elastomer such as, for example, silver/copper-filled silicone from Laird Technologies of Chesterfield, Mo., joined at the ends by a conductive pin 48a. In the illustrated embodiment, pin 48a is a gold plated brass pin such as, for example, part number YPN005-001H from Hypertronics Corporation of Hudson, Mass., though any suitable conductive material such as, for example, copper, aluminum, silver or stainless steel plated with nickel and gold may be used. In other embodiments, conductive gasket may be a preformed ring or otherwise joined at the ends by, for example, adhesive or thermal fusing. To facilitate sealing and electrical connection at distal end 38, gasket may have a generally circular, "D" shaped, rectangular, ovoid or other cross-sectional shape. Other ground connections, for example, an electrical connector tab or a conductive plate or washer between the photo diode housing 22 and fiber holder 24, are also contemplated.

Figure 4:
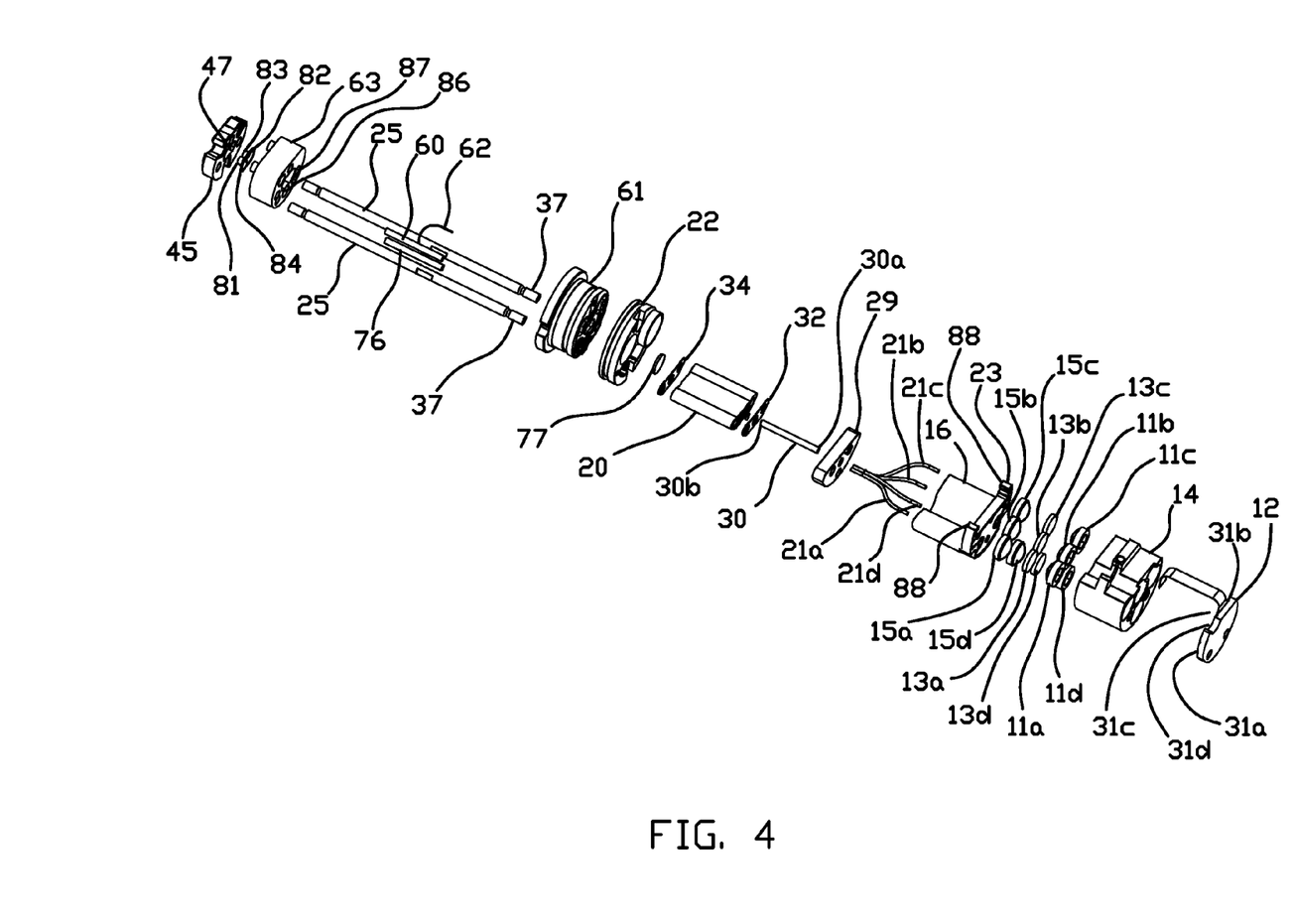
FIG. 4 is an exploded perspective view of the optics of the spectrometer interface shown in FIG. 3.

FIG. 4 is an exploded perspective view showing details of the optics of the spectrometer interface 10. In the embodiment shown, source board 12 includes four light emitting diodes 31a, 31b, 31c, 31d emitting near-infrared measurement radiation generally centered at wavelengths of 680 nm, 720 nm, 760 nm and 800 nm respectively. The emitted radiation from each LED 31a, 31b, 31c, 31d passes through source optics to collimate and direct the radiation from each LED onto a radiation source fiber optic 21a, 21b, 21c, 21d within radiation source fiber housing 16. The source optics, mounted within source optics housing 14, include, for each LED, a collimating lens 11a, 11b, 11c, 11d, a band-pass filter 13a, 13b, 13c, 13d and a focusing lens 15a, 15b, 15c, 15d. The band-pass filters control the emitted radiation to 10 nm full width-half max. Optics housing 14 may be made from, for example, 6061-T6 aluminum to provide a light weight, rigid structure.

Figure 5:
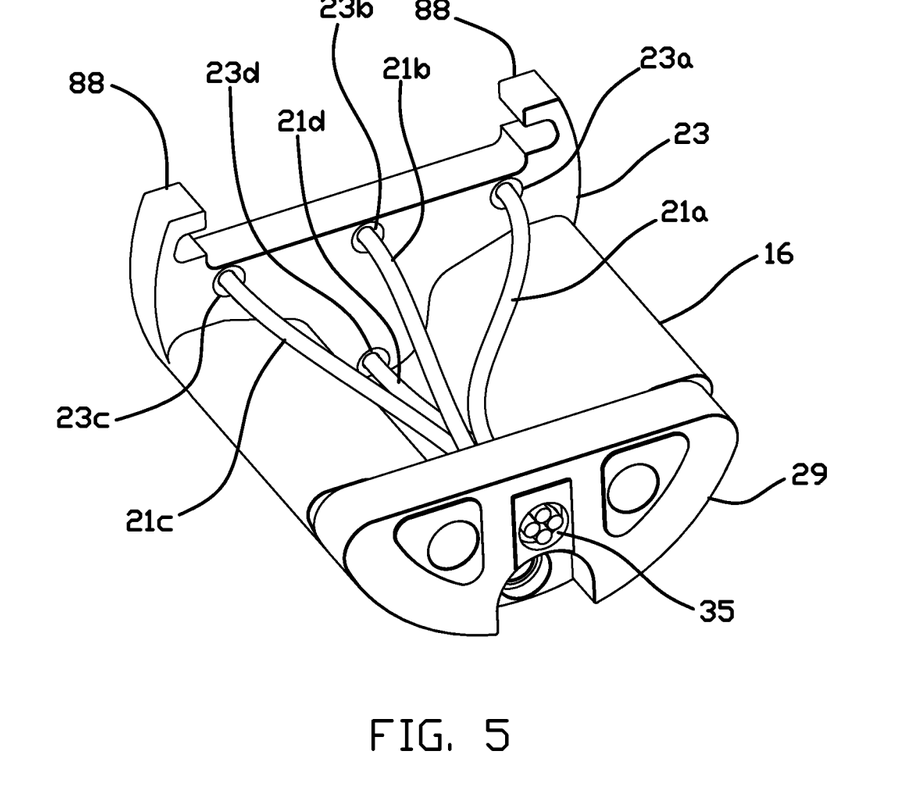
FIG. 5 is a perspective view of the radiation source fiber housing of FIG. 4.

As shown in FIG. 5, source radiation fiber housing 16 is comprised of proximal source fiber terminator plate 23 and distal source fiber terminator plate 29. Terminator plates 23, 29 may be made from, for example, 6061-T6 aluminum to allow for precise machining of critical features while providing a light weight, rigid structure. An input end of each radiation source fiber 21a, 21b, 21c, 21d is optically coupled to a focusing lens 15a, 15b, 15c, 15d via fiber ferrules or terminators 23a, 23b, 23c, 23d. To enable the compact size of spectrometer 10, optical coupling between the LED sources 31a, 31b, 31c, 31d and radiation mixing bar 30 (FIG. 4) is provided by routing the output end of each source fiber bundle in a relatively short "S" shaped path to fiber ferrule or terminator 35. Fiber terminators 23a, 23b, 23c, 23d, 35 may include grooves (not shown) to provide a mechanical interlock and improve the adhesive retention between source fibers 21a, 21b, 21c, 21d and fiber terminators 23, 29. In some embodiments, source fibers 21a, 21b, 21c, 21d are 0.75 mm diameter image fibers, part number MBI-750 from Asahi Kasei Corporation of Tokyo, Japan. Image fibers, fused bundles of 7400 individual fibers, provide optimal bend radius to fiber diameter ratio, minimize radiation leakage at the bend locations and provide sufficient angular distribution and spatial uniformity at the output ends. In other embodiments, source fibers may be clad solid core fibers such as PGR-FB750 from Toray Industries of Tokyo, Japan.

As further shown in FIGS. 4, 9a, 9b and 9c, the output end of each source fiber 21a, 21b, 21c, 21d is optically coupled to the input end 30a of a mixing bar 30 via a thin film coupler 32, 32a, 32b. The output end 30b of mixing bar 30 is optically coupled to a measurement radiation output fiber 60 and a reference fiber 62 via a thin film coupler 34, 34a, 34b. Film couplers prevent instabilities in optical transmission that may be caused by interference effects.

Figure 9A:
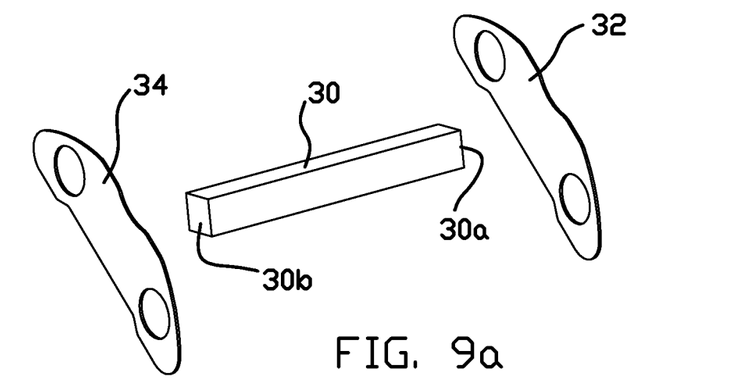
FIGS. 9a, 9b and 9c are exploded perspective views of the mixer bar and film couplers according to an embodiment of the present invention.

In one embodiment, film couplers 32, 34 may be approximately 0.125 mm thick and may be stamped or otherwise formed from a silicone rubber sheet having a durometer of 50 Shore A such as part number 87315K61 from McMaster-Carr of Elmhurst, Ill. The semi-rigid film couplers 32, 34 provide a number of advantages over commonly known adhesive coupling materials. Semi-rigid film couplers provide an optical coupling surface free from air bubbles (surface wetting) and are not subject to squeeze-out during assembly, shrinkage during curing, creep deformation or cracking over time.

Figure 9B:
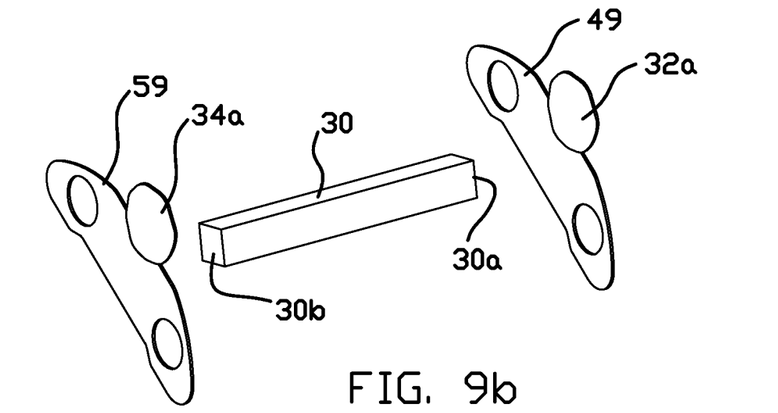

In another embodiment, film couplers 32a, 34a may be formed from cast-in-place silicone paste such as, for example, TSE 392C from Momentive Performance Materials of Albany, N.Y. Cast-in-place film couplers 32a, 34a may be surrounded by optical shims 49, 59, respectively to control the thickness and location of couplers 32a, 34a. Shim 49 may be sized and shaped to at least partially surround the optical interfaces of mixer bar 30 and source fibers 21a, 21b, 21c, 21d. Shim 59 may be sized and shaped to at least partially surround the optical interface of mixer bar 30 and measurement radiation output fiber 60 and a reference fiber 62. Shims 49, 59 may be made from 300 series stainless steel having a thickness of 0.125 mm. The cast-in-place couplers may be formed by applying silicone paste at the optical interfaces of mixer bar input and output ends 30a, 30b such that, during assembly of spectrometer 10, couplers 32a, 34a solidify to a thickness defined by shims 49, 59.

Figure 9C:
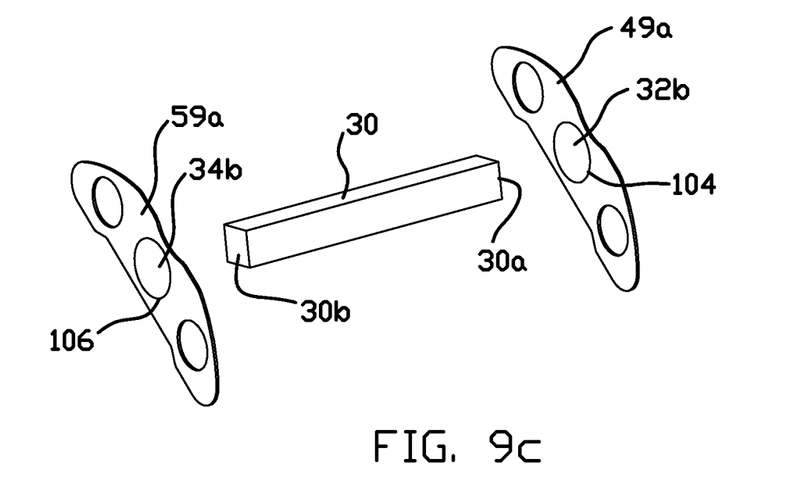

In yet another embodiment, air-film couplers 32b, 34b are formed at the optical interfaces of mixer bar input and output ends 30a, 30b by optical shims 49a, 59a via openings 104, 106. Shims 49a, 59a may be made from 300 series stainless steel having a thickness of 0.125 mm and may be sized and shaped to approximately match and provide even clamping for the end faces of mixing housing 20.

Mixer 30 is made from, for example, SF 11 glass, Schott North America Inc. of Duryea, Pa., and is sized and shaped to equally distribute the intensity of the measurement radiation output. Schott SF 11 glass, or equivalent, is used because, among other things, it does not degrade in medical x-ray environments and it provides desirable optical (transmittance, refractive index, dispersion), mechanical and thermal properties for the range of wavelengths employed. In the embodiment shown, mixer 30 has an essentially constant, rectangular cross-section along its length. Other polygonal cross-sectional shapes such as, for example, triangular, circular, oval, trapezoidal and/or octagonal may also be used. The cross-sectional shape of mixer 30 may also vary between input and output ends 30a, 30b, respectively.

Figure 6:
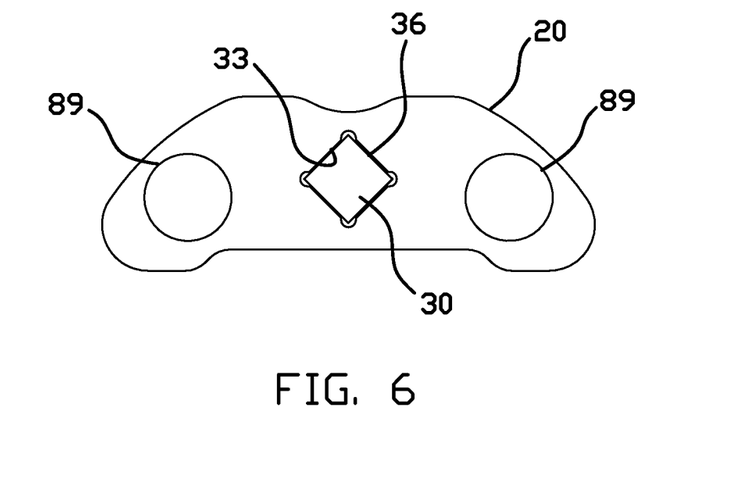
FIG. 6 is a cross-sectional view, taken along line 6-6 in FIG. 3, of the radiation mixing housing in accordance with an embodiment of the present invention.

Mixer 30 is enclosed and approximately centered within a radiation mixing housing 20. In some embodiments, mixing housing 20 is made of Kovar® alloy, which has a coefficient of thermal expansion matched to the mixer bar glass. As shown in FIG. 6, taken along line 6-6 in FIG. 3, mixer bar 30 is mounted in the housing 20 with a sphere or bubble-filled epoxy 36. The epoxy, for example, Epo-Tek 301, Epoxy Technology of Billerica, Mass., has a lower numerical aperture than mixer bar 30 to maintain total internal reflection of the measurement radiation within the mixer bar. The bubbles, for example, 3MTM iM30K Hi-Strength Glass Bubbles, 3M energy and Advanced Materials Division of St. Paul, Minn., have an average diameter of 18 um each and provide a relatively solid, thin, uniform epoxy bond line to prevent the mixer bar 30 from contacting the inner walls 33 of the mixing housing 20 and to maintain alignment (maximize radiation transfer) between the mixer bar 30 and adjacent optics. Other materials such as, for example, plastic spheres or bubbles can be incorporated into the epoxy as well. The thin, uniform epoxy bond line provides for a stronger, essentially tension-free bond between the square bar mixer 30 and the housing walls 33. A thicker, non-uniform bond line may be more susceptible to failure and experience more shrinkage during curing. In some cases, a failed bond line could cause shifting of the mixer bar off-optical axis or create air gaps resulting in undesirable Fresnel effects at the optical interfaces. Tension in the mixer bar caused from increased shrinkage of a thicker bond line could result in stress cracks in the mixer bar and undesirable effects on the optical throughput.

Cross-sectional views, taken along line 7a-7a and 7b-7b in FIG. 3, of the fiber holder or housing 24, photo diode housing 22, radiation mixing housing 20 and processor board 18 are shown in FIGS. 7a and 7b. As shown, fiber holder 24 is comprised of proximal fiber block 61 and distal fiber block 63. Distal fiber block 63 includes output terminator or ferrule 68 and input terminator or ferrule 73. Ferrules 68, 73 optically interface, via connector 52, with send and receive fibers 55 and 56, respectively, of sensor 50. Reference radiation attenuator 70 and reference radiation photo diode 19 are supported within photo diode housing 22. Measurement radiation output fiber 60 and reference radiation fiber 62 are optically coupled to mixing bar 30 via film coupler 34 and straight wall guiding aperture 64. Reference radiation fiber 62 is optically coupled to attenuator 70 via feedback aperture 67 and straight wall guiding aperture 66.

Output fiber is guided to output ferrule 68 via straight wall aperture 64, grooved aperture 65 and output aperture 92. Reference fiber 62 is guided to attenuator 70 via straight wall aperture 64, grooved aperture 65, feedback aperture 67, grooved aperture 69 and straight wall aperture 66. Straight wall aperture 64 serves to maintain perpendicularity (parallelism to optical axis) of measurement radiation output fiber 60 and reference radiation fiber 62 to mixing bar 30. Apertures 64, 65 may have an approximately tear-dropped shaped cross-section to accommodate both fiber bundle 60 and fiber 62. Straight wall guiding aperture 66 serves to maintain perpendicularity (parallelism to optical axis) of reference radiation fiber 62 to attenuator 70. Grooved apertures 65 and 69 provide a mechanical interlock to improve the adhesive retention of fibers 60, 62 within proximal fiber block 61. In the illustrated embodiment, grooved apertures 65, 69 have generally annular grooves 65a, 69a, respectively. In other embodiments (not shown), grooved apertures may have, for example, generally helical or linear grooves. To provide rigidity and support during assembly, precise machining of critical features and an electrically conductive path to shield housing 26, proximal fiber block 61 may be made from, for example, 6061-T6 aluminum. To provide an optically flat-black, electrically insulating component while allowing precise machining of critical features, distal fiber block 63 may be made from, for example, RS500 Radel® polyethersulfone. Making distal fiber block 63 out of an optically flat-black material minimizes stray light interference with measurement, reference and reflected radiation optics.

In some embodiments, output fiber 60 is a 1.5 mm diameter image fiber, part number MBI-1500 from Asahi Kasei Corporation of Tokyo, Japan and reference fiber 62 is a 0.25 mm diameter solid core fiber. In certain embodiments, output fiber 60 is a fused bundle of 7400 individual fibers and preserves the spatial uniformity of the radiation output from mixing bar 30 while providing room for reference fiber 62 within aperture 64. In other embodiments, not shown, output fiber 60 may be a clad solid core fiber such as, for example, PGR-FB1500 from Toray Industries of Tokyo, Japan.

Reference fiber 62 directs approximately 3% (reference radiation) of the output radiation from mixing bar 30 to reference photo diode 19. So that the intensity of the reference radiation is comparable with the intensity of the radiation reflected from the patient measurement site, the reference radiation is attenuated by attenuator 70. As shown, attenuator 70, within photo diode housing 22, includes scattering media 71 and attenuating pin-hole aperture 72. Scattering media 71 is mounted in attenuator mount opening 91 and includes radiation input end 71a and radiation output end 71b. Scattering media should be thermally stable, hygrothermally stable and insensitive to differences in angular distribution from the various wavelengths of measurement radiation. Scattering media may be, for example, an optical grade, diffuse reflectance, thermoplastic resin having a relatively flat spectral distribution such as, for example, Spectralon® reflectance material from Labsphere of North Sutton, N.H. Other materials such as, for example, a silicon dioxide-epoxy material may also be used for scattering media.

Figure 8:
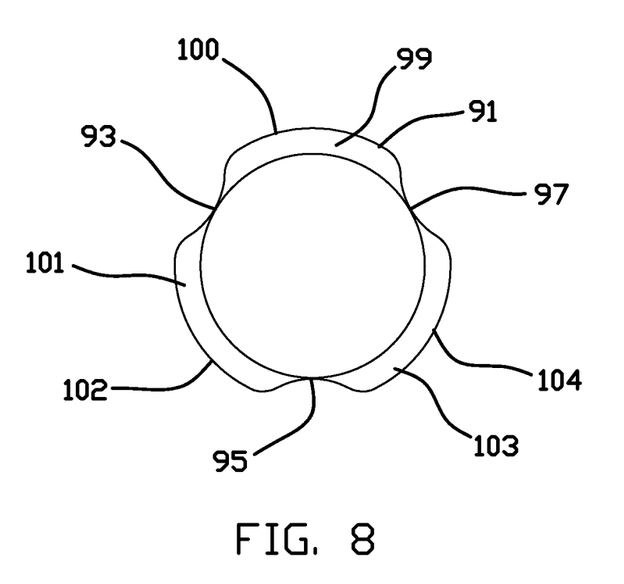
FIG. 8 is an end view of the attenuator mount opening according to one embodiment of the present invention.

As shown in FIG. 8, which is an end view of opening 91 and input end 71a of scattering media 71, opening 91 may have an approximately circular cross-section and includes relief areas 100, 102, 104 such that cylindrically shaped scattering media 71 is frictionally supported along side surface locations 93, 95, 97 and surrounded by air gaps 99, 101, 103. By using a line-on-line friction or press fit to mount scattering media 71, the need for other mounting means such as epoxy is eliminated. During heating and cooling cycles, epoxy can tend to shrink causing an inconsistent optical interface between scattering media 71 and the walls of opening 91. Air gaps 99, 101, 103 create a stable, consistent optical interface between scattering media 71 and the walls of opening 91 and thus more consistency in the reference radiation directed to photo diode 19.

While opening 91 is shown to have an approximately circular cross-section with relief areas 100, 102, 104 and scattering media 71 is shown to have a substantially circular cross-section, other sizes and shapes that provide a line-on-line or reduced-contact-area press fit mounting and air gaps are contemplated. For example, scattering media 71 and opening 91 may both have substantially rectangular or circular cross-sections with small, equidistantly-located protrusions providing the reduced-contact-area press fit mounting and air gaps. Alternatively, opening 91 may have a substantially rectangular or triangular cross-section and scattering media 71 may have a substantially circular cross-section or opening 91 may have a substantially circular cross-section and scattering media 71 may have a substantially rectangular or triangular cross-section.

Attenuating pin-hole aperture 72 serves to further attenuate the intensity of the reference radiation delivered to reference photo diode 19. Aperture 72 may have a cross-sectional area that is less than the cross-sectional area of scattering media 71 and less than the active area of photo diode 19. In the embodiment shown, pin-hole aperture 72 is approximately 0.75 mm, though larger or smaller apertures are contemplated. Photo diode housing 22 is made from, for example, R5500 Radel® polyethersulfone, which provides an electrically insulating, optically flat-black component that allows for precise machining of critical features.

As shown in FIG. 3, reflected radiation photo diode 17 and reference radiation photo diode 19 are mounted on a distal end edge 74 of processor board 18. Measurement radiation transmitted into and reflected from the patient measurement site (reflected radiation) is directed to reflected radiation photo diode 17 via receive fiber 56, reflected radiation fiber 76 and ambient light filter 77 (FIG. 4). Reflected radiation fiber 76 is, for example, a 1.5 mm diameter solid core fiber and is guided to photo diode 17 via input aperture 94, grooved aperture 96 and straight wall aperture 98 (FIG. 7a). Grooved and straight walled apertures 96, 98 are similar to apertures 65, 69 and 64, 66, respectively, described above with respect to output fiber 60 and reference fiber 62. Ambient light filter 77 filters radiation outside of the measurement radiation range between about 680 nm and 800 nm and also prevents saturation of photo diode 17.

Photo diodes 17, 19 convert reflected and reference radiation to electrical current signals. Processor board 18 converts the reflected radiation electrical signals into StO2 data and uses the reference radiation electrical signal to compensate for variation in measurement radiation due to, for example, degradation of the source LED's 31a, 31b, 31c, 31d. StO2 data can be stored on processor board 18 or directly displayed on display unit 40. The electrical signals from the reflected radiation may be converted to StO2 data using the algorithm disclosed in U.S. Pat. No. 5,879,294, which is incorporated herein by reference in its entirety for all purposes. Additionally, the electrical signals from the reflected radiation may be converted to a tissue hemoglobin index (THI) measurement using the algorithm disclosed, for example, in U.S. Pat. No. 6,473,632, herein incorporated by reference in its entirety for all purposes.

Spectrometer 10 further includes sensor contact sockets 78, 80 protruding through openings 86, 87 in fiber block 63 and electrically connected to board 18 via power and ground wires 79, 81. Contact sockets 78, 80, such as part number YSK006-010AH from Hypertronics Corporation of Hudsen, Mass., are accessible through opening 47 of alignment disk 45 to engage with sensor pins connected to an integrated circuit chip (not shown) within the sensor-end of optical connector 52. The integrated circuit chip can be preprogrammed with, for example, calibration data, encryption information and/or a sensor-use timing counter. Processor board 18 reads preprogrammed information from and writes probe use time to sensor circuit chip. In one embodiment the sensor circuit chip and processor board 18 may be programmed to send a sensor-use time signal to display unit 40. To provide for multiple, reliable connection and disconnection between sensor 50 and spectrometer 10 without damaging the sensor pins, contact sockets 78, 80 must freely float within opening 47.

To prevent fluid ingress and debris from damaging the sensitive electrical and optical components within spectrometer 10, contact sockets 78, 80 and opening 47 are sealed by boot 82. Seal boot 82 includes a base 84 and socket boots 81, 83. Seal boot 82 is sandwiched between alignment disk 45 and fiber holder 24 such that base 84 seats within a recess 85 of distal fiber block 63 and socket boots 81, 83 fit over and seal contact sockets 78, 80. As shown, socket boots 81, 83 are generally conically shaped and have curved, tapering side walls. Socket boot shapes such as cylindrical, rectangular or conical with straight side walls could also be used. Boot 82 can be made from, for example, silicone having a durometer of 45 Shore A, and may provide a flexible, impermeable seal that allows contacts 78, 80 to float within opening 47.

To enable the compact size and shape of spectrometer 10, source radiation fiber housing 16, processor board 18, mixing housing 20 and photo diode housing 22 are designed to be nested together. Proximal source fiber terminator 23 of fiber housing 16 includes tabs 88 (FIG. 5) for engaging and supporting proximal end 75 of processor board 18. In this way, fiber housing 16 overlaps approximately one-half to two-thirds of board 18. Mixing housing 20 overlaps the remaining one-third to one-half of board 18 and is supported by alignment pins 25 via alignment apertures 89 (FIG. 6). Photo diode housing 22 includes aperture 90 (FIG. 3) through which mixing housing 20 slidably passes to provide optical coupling, via coupler 34, between mixing bar 30 and measurement radiation output fiber 60 and reference radiation fiber 62.

In one example of the operation of StO2 monitoring system 8, the LED's 31a, 31b, 31c, 31d are sequentially energized to transmit measurement radiation from source board 12, one wavelength at a time, through spectrometer optics and send fiber 55 to a patient measurement site. Exemplary measurement sites may include, for example, the thenar eminence and/or the deltoid muscle. Radiation reflected from the tissue within the measurement site is transmitted back through receive fiber 56 and reflected radiation fiber 76 to photo diode 17 and processor board 18 where an absorbance value is calculated. The foregoing send-receive-absorbance calculation process is repeated for each of the four measurement radiation wavelengths. A ratioed second derivative absorbance value is calculated from the measured absorbance values and compared with predetermined stored data correlating ratioed second derivative absorbance values with StO2 values. In this manner, StO2 values are calculated and either stored on processor board 18 or displayed by display unit 40 every two seconds.

Advantages provided by this invention include providing physicians with a portable StO2 spectrometer that remains attached to the patient and provides continuous monitoring of StO2 during transport to various treatment locations within the hospital. Spectrometer interface 10 and optical cable 54, being robust to ionizing radiation, allow for continuous monitoring of StO2 during radiation procedures such as X-ray and CT imaging. Because spectrometer 10 is essentially self-contained, it can be used with different display units throughout the hospital. For example, display unit 40, such as the Model 650 InSpectra StO2 Monitor from Hutchinson Technology, Hutchinson, Minn. may be connected to spectrometer 10 during X-ray while another display unit such as the IntelliVue MP90 from Phillips Healthcare, Andover, Mass. may be connected to spectrometer 10 in a recovery room.

Although the present invention is described and shown with reference to the illustrated embodiments, those skilled in the art will recognize that changes can be made in form and detail without departing from the spirit and scope of the invention. For example, fewer than or greater than four wavelengths of measurement radiation may be employed such as disclosed in, for example, published U.S. Patent Publication No. 2005/0277818, which is incorporated herein by reference in its entirety for all purposes. Other patient interface optical sensor and/or display unit designs may also be used with the spectrometer interface. For example, a clip-on or spot check-type optical sensor and/or a portable or hand held display unit may be used.

What is claimed is:

1. A spectrometer for interfacing an optical sensor with a display unit, the spectrometer comprising:

a plurality of measurement radiation sources;
a plurality of radiation source fibers, each radiation source fiber optically coupled to one of the plurality of measurement radiation sources;
a reflected radiation fiber optically coupled to the optical sensor;
a measurement radiation output fiber comprised of an image fiber;
a radiation mixing bar intermediate the plurality of radiation source fibers and the measurement radiation output fiber, an input end of the radiation mixing bar optically coupled with the plurality of radiation source fibers and an output end of the radiation mixing bar optically coupled with the measurement radiation output fiber;
a reference radiation fiber having an input end optically coupled to the output end of the radiation mixing bar and an output end optically coupled to an attenuator;
a shield housing that is electrically conductive to provide electromagnetic interference shielding, each of the plurality of measurement radiation sources, the plurality of radiation source fibers, the radiation mixing bar, and the reference radiation fiber within the shield housing,
wherein the radiation mixing bar is optically coupled to at least one of the plurality of radiation source fibers and the measurement radiation output fiber via a film coupler, and
wherein a shim surrounds at least a portion of the film coupler.

2. The spectrometer of claim 1, wherein the attenuator comprises a scattering media and an aperture.

3. The spectrometer of claim 2, wherein:
the scattering media has input and output ends separated by at least one side surface; and
the scattering media is frictionally mounted within an opening such that at least a portion of the side surface is separated from the opening by an air gap.

4. The spectrometer of claim 3, wherein the opening is sized and shaped to provide at least three contact areas and at least three air gaps along the side surface of the scattering media.

5. The spectrometer of claim 1, further including:
a fiber holder having at least one fiber aperture, the fiber aperture having a plurality of grooves;
wherein at least one of the reflected radiation fiber, the reference radiation fiber and the measurement radiation output fiber bundle centrally located and adhesively secured within the fiber aperture.

6. The spectrometer of claim 5, further including:
a reflected radiation photo diode;
a reference radiation photo diode;
a processor board for controlling the measurement radiation sources and converting reflected radiation and reference radiation signals into electrical signals;
the processor board having side edges separated by proximal and distal end edges;
the reflected radiation and reference radiation photo diodes mounted on the proximal end edge of the processor board;
a plurality of contact sockets electrically connected to the processor board, each contact socket having a distal end protruding through an opening in the fiber holder; and
a seal boot intermediate the opening and the distal ends of the contact sockets.

7. The spectrometer of claim 1, further including a radiation mixing housing, the radiation mixing bar centrally located within the radiation mixing housing; wherein a space between the radiation mixing bar and radiation mixing housing is filled with a layer of bubble-filled epoxy.

8. The spectrometer of claim 7, wherein the radiation mixing bar has a square-shaped cross section.

9. The spectrometer of claim 1, wherein the radiation source fibers are image fibers.

10. The spectrometer of claim 1, further comprising:
an electrical connector configured to releasably connect the spectrometer to the display unit via an electrical cable; and
an optical connector configured to releasably connect the spectrometer to the optical sensor via an optical cable.

11. The spectrometer of claim 10, wherein the optical cable comprises a radiation shielding covering an optical fiber, the radiation shielding comprising a tungsten-filled thermoplastic.

12. A spectrometer for interfacing an optical sensor with a display unit, the spectrometer comprising:
a plurality of measurement radiation sources;
a source optics housing, the plurality of measurement radiation sources within the source optics housing;
a plurality of radiation source fibers;
a radiation source fiber housing, the plurality of a radiation source fibers within the radiation source fiber housing;
a plurality of source optics coupling each source fiber to one of the plurality of measurement radiation sources;
a measurement radiation output fiber;
a reference radiation fiber;
a reflected radiation fiber optically coupled to the optical sensor;
a radiation mixing bar;
a radiation mixing housing, the radiation mixing bar within the mixing bar housing;
the radiation source fibers being optically coupled to an input end of the mixing bar;
the measurement and reference radiation fibers being optically coupled to an output end of the mixing bar;
a shield housing that is electrically conductive to provide electromagnetic interference shielding;
the source optics housing, radiation source fiber housing, and the radiation mixing housing located within the shield housing in a serial arrangement;
the source optics housing, radiation source fiber housing, and the radiation mixing housing housings being supported and aligned with respect to each other in the serial arrangement by a plurality of pins; and
a first shim located between the radiation source fiber housing and the radiation mixing housing, the first shim at least partially surrounding a first film coupler between the radiation mixing bar and the plurality of radiation source fibers;
a second shim at least partially surrounding a second film coupler between the radiation mixing bar and both of the measurement radiation output fiber and the reference radiation fiber.

13. A spectrometer for interfacing an optical sensor with a display unit, the spectrometer comprising:
a plurality of radiation sources;
a plurality of radiation source fibers optically coupled to the radiation sources, the plurality of a radiation source fibers within a radiation source fiber housing;
a radiation mixing bar optically coupling the radiation source fibers to measurement radiation and reference radiation fibers, the radiation mixing bar within the radiation mixing housing;
a first shim located between the radiation source fiber housing and the radiation mixing housing, the first shim at least partially surrounding a first film coupler between the radiation mixing bar and the plurality of radiation source fibers;

a second shim at least partially surrounding a second film coupler between the radiation mixing bar and both of the measurement radiation output fiber and the reference radiation fiber photo diodes for receiving reference radiation from the radiation sources and reflected radiation from the optical sensor;

a processor board for controlling the radiation sources and processing signals received from the photo diodes;

a shield housing that is electrically conductive to provide electromagnetic interference shielding, the radiation sources, radiation source fibers, radiation mixing bar, photo diodes and processor board being substantially entirely contained within the shield housing;

an electrical connector configured to releasably connect the spectrometer to the display unit via an electrical cable; and an optical connector configured to releasably connect the spectrometer to the optical sensor via an optical cable.

14. The spectrometer of claim 13, wherein the optical cable has at least one optical fiber and a radiation shielding covering over the optical fiber.

15. The spectrometer of claim 14, wherein the radiation shielding covering comprises a tungsten-filled thermoplastic.

16. The spectrometer of claim 13, further including a fiber holder for supporting the measurement radiation and reference radiation fibers, the fiber holder being electrically coupled to the shield housing.

17. The spectrometer of claim 16, wherein the fiber holder is electrically coupled to the conductive housing by a conductive gasket.

18. The spectrometer of claim 17, wherein the conductive gasket is a length of conductor-filled elastomer joined at the ends with a conductive pin.

19. A spectrometer for interfacing an optical sensor with a display unit, the spectrometer comprising:

a plurality of measurement radiation sources;

a plurality of radiation source fibers, each radiation source fiber optically coupled to one of the plurality of measurement radiation sources;

a radiation source fiber housing, the plurality of a radiation source fibers within the radiation source fiber housing;

a reflected radiation fiber optically connectable to the optical sensor;

a measurement radiation output fiber comprised of an image fiber;

a radiation mixing bar intermediate the plurality of radiation source fibers and the measurement radiation output fiber;

a radiation mixing housing, the radiation mixing bar within the radiation mixing housing;

a reference radiation fiber optically coupled to an attenuator;

a first shim located between the radiation source fiber housing and the radiation mixing housing, the first shim at least partially surrounding a first film coupler between the radiation mixing bar and the plurality of radiation source fibers;

a second shim at least partially surrounding a second film coupler between the radiation mixing bar and both of the measurement radiation output fiber and the reference radiation fiber; and a shield housing that is electrically conductive, the shield housing providing electromagnetic interference shielding to the plurality of measurement radiation sources, the plurality of radiation source fibers, and the radiation mixing bar.

20. The spectrometer of claim 19, further comprising:

an electrical connector configured to connect the spectrometer to the display unit via an electrical cable; and an optical connector configured to connect the spectrometer to the optical sensor via an optical cable.

* * * * *